May 21, 1963     V. COULIN     3,090,849
LIQUID LEVEL RESPONSIVE SWITCH
Filed April 20, 1960     3 Sheets-Sheet 1

INVENTOR.
Victor Coulin
BY
Michael S. Striker
Attorney

May 21, 1963

V. COULIN 3,090,849

LIQUID LEVEL RESPONSIVE SWITCH

Filed April 20, 1960

INVENTOR.
Victor Coulin
BY
Michael S. Striker
Attorney

May 21, 1963 V. COULIN 3,090,849
LIQUID LEVEL RESPONSIVE SWITCH
Filed April 20, 1960 3 Sheets-Sheet 3

INVENTOR.
Victor Coulin
BY Michael S. Striker
Attorney

United States Patent Office 3,090,849
Patented May 21, 1963

3,090,849
LIQUID LEVEL RESPONSIVE SWITCH
Victor Coulin, Sofocles 342-B, Mexico City, Mexico
Filed Apr. 20, 1960, Ser. No. 109,235
6 Claims. (Cl. 200—84)

The present invention relates to apparatus for maintaining the level of liquid in a container between preselected limits. More particularly, the invention relates to apparatus for bringing the level of a liquid up to a predetermined height after the liquid level moves down from the latter height by a predetermined extent.

An object of the present invention is to provide apparatus utilizing a minimum of liquid-corrosive components for maintaining the level of a liquid in a container between preselected limits.

Another object of the present invention is to provide apparatus utilizing a minimum of components which may stick in operation for maintaining the level of a liquid in a container between preselected limits.

Still another object of the present invention is to provide apparatus utilizing relatively simple but highly efficient and reliable components for maintaining the level of a liquid in a container between preselected limits.

In accordance with the present invention, apparatus for maintaining the level of liquid in a container between preselected limits comprises electrically energized control means for supplying liquid to the container. A float is adapted to float on the liquid in the container and is guided in substantially non-vertical motion relative to a side wall of the container. Thus, as the float moves up and down with the liquid level changes through positions which differ with changes in liquid level, at any one liquid level the float will have a position different from the position of the float at any other level; the float having a first position when the liquid level is at the preselected height, and when the liquid level is lower than the preselected height by a given amount, the float will have a second position differing from the first position by more than a mere change in elevation of the float. A switch means is mounted in the float and connected in a circuit for energizing the control means and comprises a circuit contact and a contact component. In one possible embodiment of the invention the contact component of the switch means is pivotally mounted in the switch means in a manner whereby the contact component is inclined at an angle with reference to the switch means and contacts the contact to close the circuit to energize the control means when the float is in the second position and whereby the contact component is inclined at another angle with reference to the switch means and breaks contact with the contact to open the circuit to de-energize the control means when the float is in the first position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In the figures the same components are labeled with the same reference numerals.

Figure 4:
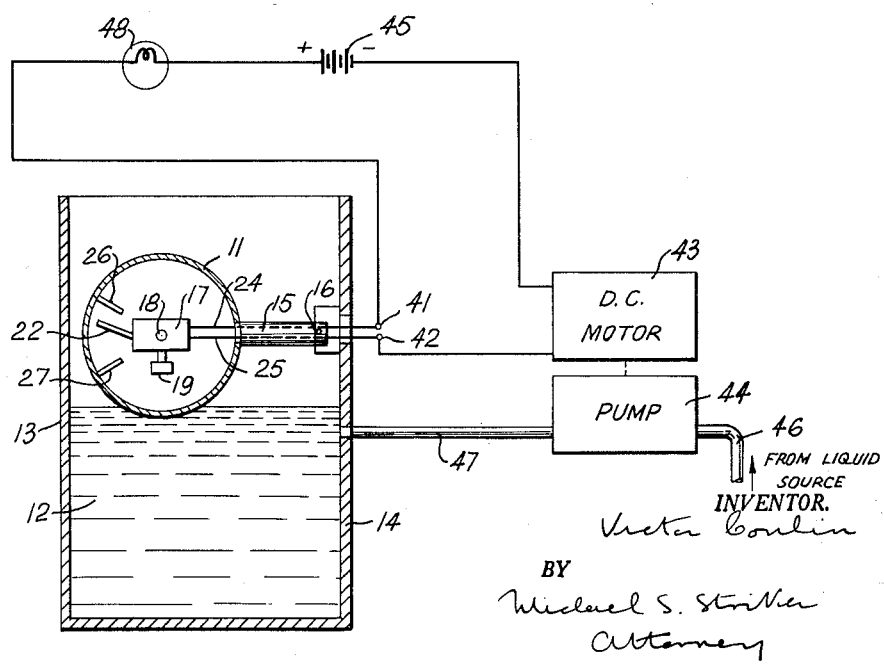
FIG. 4 is a schematic diagram, partly block diagram and partly circuit diagram, of an embodiment of the apparatus of the present invention.

A float 11 is adapted to float on the liquid 12 in a container or tank 13 (shown in FIG. 4). The container 13 has a side wall 14 on which a substantially tubular support arm 15 is pivotally supported at one end by pivot means 16. The other end of the support arm 15 is connected to the float 11. The float 11 is thus supported for substantially arcuate motion relative to the side wall 14 of the container 13 so that as the float moves up and down with liquid level changes it moves through positions which differ with changes in liquid level. Thus, at any one liquid level the float will have a position and inclination different from the position and inclination of the float at any other level; the float having a first position and inclination when the liquid level is at a preselected height (FIG. 2) and a second position and inclination when the liquid level is lower than the preselected height by a predetermined extent (FIG. 3).

Figure 5:
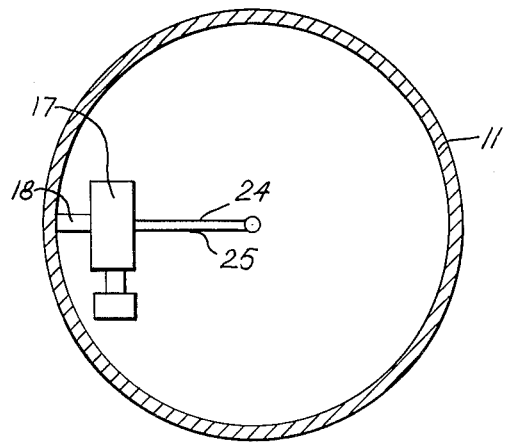
FIG. 5 is a side view, partly in section, of a portion of the float portion of the embodiment of FIG. 1.

Switching means or switch unit 17 is pivotally mounted in the float 11 by pivot means 18. FIG. 5 indicates the switch unit 17 from the side to illustrate the pivotal mounting thereof by the pivot means 18. The switch unit 17 is weighted by a hanging weight 19 which may be affixed to said switch unit in any suitable manner, such as, for example, by attachment to the bottom wall of said switch unit or attachment to the end of an arm or flexible member, such as, for example, an arm 20, the other end of which is attached to the said switch unit. Thus, the switch unit 17 is maintained, due to its pivotal mounting and weight 19, in a substantially vertical position at any position and inclination of the float 11.

The switch unit 17 comprises a fixed circuit contact 21 and a contact component or switch arm 22 pivotally mounted by pivot means 23 in said switch unit and extending therefrom. The switch unit 17 is connected in a control circuit for energizing electrically energized control means for supplying liquid to the container 13, as will be described hereinafter, by means of electrically conductive leads 24 and 25, respectively. The electrically conductive leads 24 and 25 pass through the substantially tubular support arm 15 from the control circuit into the float 11 and thence into the switch unit 17. The lead 24 is connected to the fixed circuit contact 21 and the lead 25 is connected to the switch arm 22, preferably through the pivot means 23. The switch arm 22 is electrically conductive between the pivot means 23 and the end of said switch arm inside the switch unit 17, or at least has a conductive strip extending from said pivot means to said end on the upper portion of the said arm to insure electrical contact between the said pivot means and the fixed contact 21 when the said switch arm is in a suitable position.

A pair of switch actuating protrusions 26 and 27, respectively, are carried in the float 11 spaced from each other and from the switch arm 22 which is positioned between said protrusions in a manner whereby said switch arm is moved by the said protrusions to operate the switch unit in a suitable manner to control the control circuit.

Figure 2:
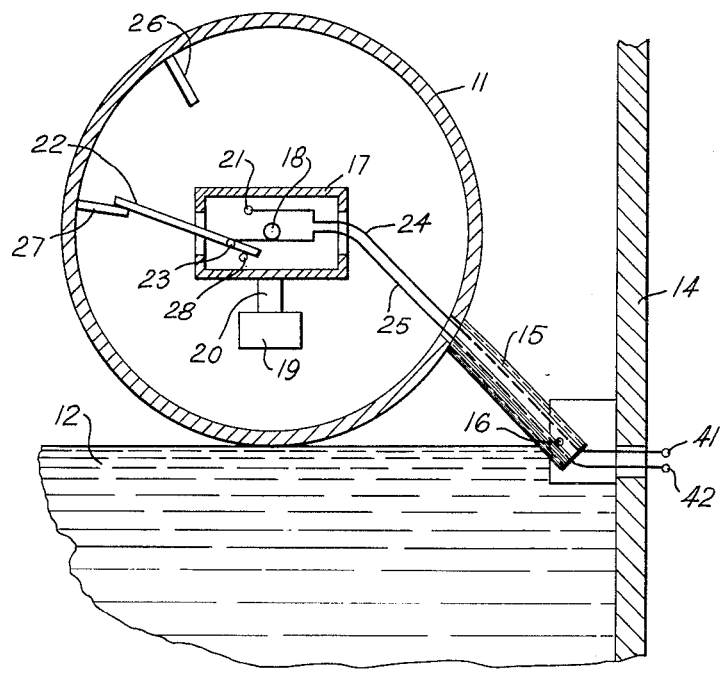
FIG. 2 is a side view, partly in section, of the float and switch portions of the embodiment of FIG. 1 when the liquid level in the container is at a preselected height.
Figure 3:
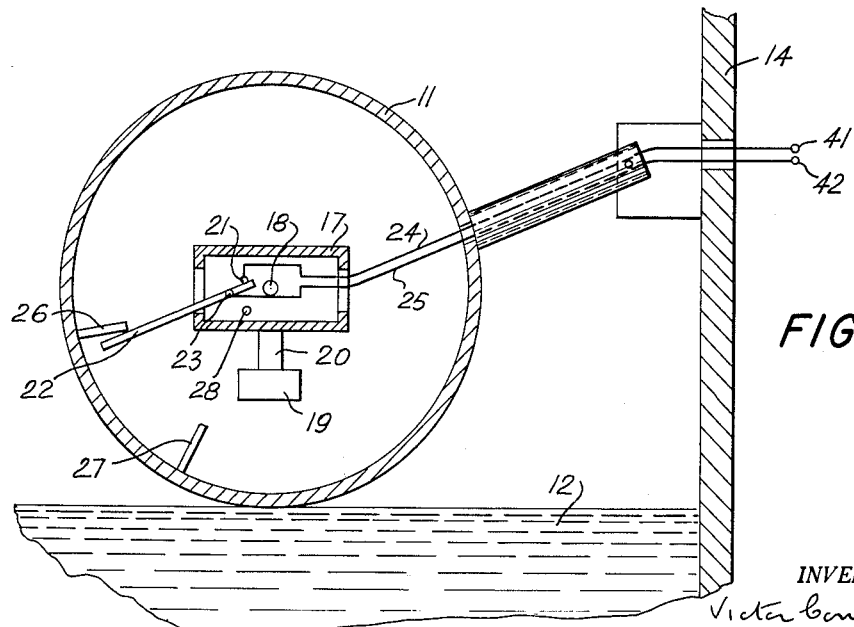
FIG. 3 is a side view, partly in section, of the float and switch portions of the embodiment of FIG. 1 when the liquid level in the container is lower than the preselected height by a predetermined extent.

In FIG. 2, the liquid level is at a preselected height so that the float 11 has a first position and inclination due to the fact that as the liquid level rises it moves said float upward in a substantially arcuate motion relative to the side wall 14 of the container 13 about the pivot means 16. Thus, in FIG. 2, the float 11 is at its first position and inclination, which position and inclination have been preselected in accordance with the desired maximum level of liquid in the container 13. The switch unit 17 is in substantially vertical position at the first position of the float as well as at any position and inclination of said float. However, the inclination of the float 11 is such that the lower switch actuating protrusion 27 abuts the switch arm 22 and urges said switch arm about the pivot means 23 to break contact with the fixed contact 21 to open the circuit to de-energize the control means connected in the circuit (FIG. 4). In the first position, the switch arm 22 may contact an unconnected or dead fixed contact 28, such as, for example, a contact 28, or may just be positioned out of contact with the fixed contact 21.

It is thus clearly seen that when the liquid level in the container 13 is at its desired maximum level of liquid, the float and switch units cooperate to de-energize the control means for supplying liquid to the container.

In FIG. 3, the liquid level is lower than the preselected height by a predetermined extent so that the float 11 has a second position and inclination due to the fact that as the liquid level subsides it moves said float downward in a substantially arcuate motion relative to the side wall 14 of the container 13 about the pivot means 16. Thus, in FIG. 3, the float 11 is at its second position and inclination, which position and inclination have been preselected in accordance with the desired minimum level of liquid in the container 13. The switch unit 17 is in substantially vertical position at the second position of the float as well as at any position and inclination of said float. However, the inclination of the float is such that the upper switch actuating protrusion 26 abuts the switch arm 22 and urges said switch arm to contact the fixed contact 21 to close the circuit to energize the control means connected in the circuit (FIG. 4). It is thus clearly seen that when the liquid level in the container 13 is at its desired minimum level of liquid, the float and switch units cooperate to energize the control means to supply liquid to the container.

Figure 1:
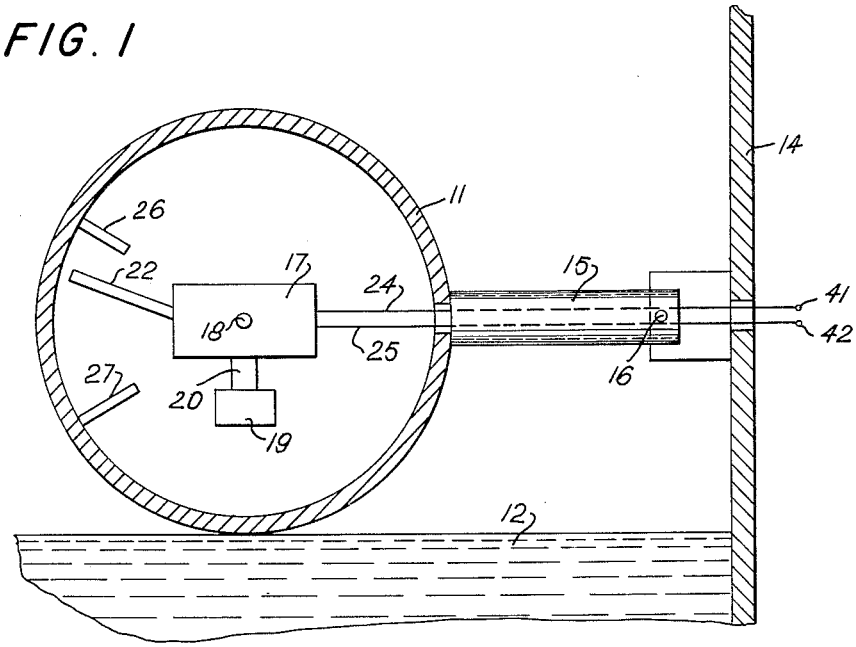
FIG. 1 is a side view, partly in section, of an embodiment of the float and switch portions of the apparatus of the present invention.

FIG. 4 is a schematic diagram, partly block diagram and partly circuit diagram, of an embodiment of the apparatus of the present invention. In FIG. 4, the float 11 is shown floating on the liquid 12 in the container or tank 13. The float 11 is pivotally supported by the side wall 14 of the container 13 by means of the support arm 15 and the pivot means 16, as discussed with reference to FIGS. 1, 2 and 3. The switch unit 17 is pivotally mounted in the float 11 by pivot means 18 and is weighted by a weight 19 to maintain it in substantially vertical position regardless of the position and inclination of the float. The electrically conductive leads 24 and 25, respectively connected to the fixed contact 21 and the switch arm 22 (FIGS. 2 and 3), extend from the switch unit 17, through the float 11, through the tubular support arm 15 and through the side wall 14 of the container 13 to circuit points 41 and 42, respectively. It is clear, from the foregoing discussion with reference to FIGS. 2 and 3, that when the switch unit 17 is in its OFF condition, that is with the switch arm 22 out of electrical contact with the fixed contact 21, there is no connection between the circuit points 41 and 42 since there is an open circuit between said switch arm and said fixed contact. It is equally clear that when the switch unit 17 is in its ON condition, that is with the switch arm 22 in electrical contact with the fixed contact 21, there is an electrical connection between the circuit points 41 and 42 since there is a closed circuit comprising circuit point 41, circuit lead 24, fixed contact 21, switch arm 22, pivot means 23, circuit lead 25 and circuit point 42.

In FIG. 4, the circuit points 41 and 42 are thus connected in the control circuit in a manner whereby said control circuit is open, and therefore de-energized, when the switch unit 17 is in its OFF condition and the control circuit is closed, and therefore energized, when the switch unit is in its ON condition. Electrically energized control means are provided for supplying liquid to the container 13. The electrically energized control means may comprise, for example, an electric motor 43 driving a pump 44. Any suitable motor-pump combination may be utilized with the apparatus of the present invention. In the embodiment of FIG. 4, a D.C. motor is utilized and is energized from a suitable source of direct current electrical energy, such as, for example, a battery 45. The pump 44 may be driven directly by the motor 43 so that when the circuit through the circuit points 41 and 42 is closed the motor is energized and actuates the pump to supply liquid to the container 13 through suitable means, such as, for example, piping 46 from a source of liquid, such as, for example, a storage tank (not shown) through piping 47 from said pump to said container. On the other hand, when the circuit through the circuit points 41 and 42 is open the motor is de-energized and the pump is deactuated and liquid is not supplied to the container 13.

It is thus seen that when the float 11 is in its second position and inclination, as shown in FIG. 3, the switch arm 22 abuts the upper switch actuating protrusion 26 and is urged about the pivot means 23 thereby to contact the fixed contact 21 to close the circuit means through circuit points 41 and 42 to energize the motor 43 and actuate the pump 44 to supply liquid to the container 13. When the float 11 is in its first position and inclination, as shown in FIG. 2, the switch arm 22 abuts the lower switch actuating protrusion 27 and is urged about the pivot means 23 to break contact with the fixed contact 21 to open the circuit through circuit points 41 and 42 to de-energize the motor 43 and deactuate the pump 44 to prevent the supply of liquid to the container 13.

A suitable signalling means, such as, for example, a lamp 48, may be connected in series with the battery 45 to indicate the energization condition of the circuit. Thus, when the circuit is closed, so that the control means for supplying liquid to the container is energized, the lamp 48 will be ON and when the circuit is open, said lamp will be OFF.

Figure 6:
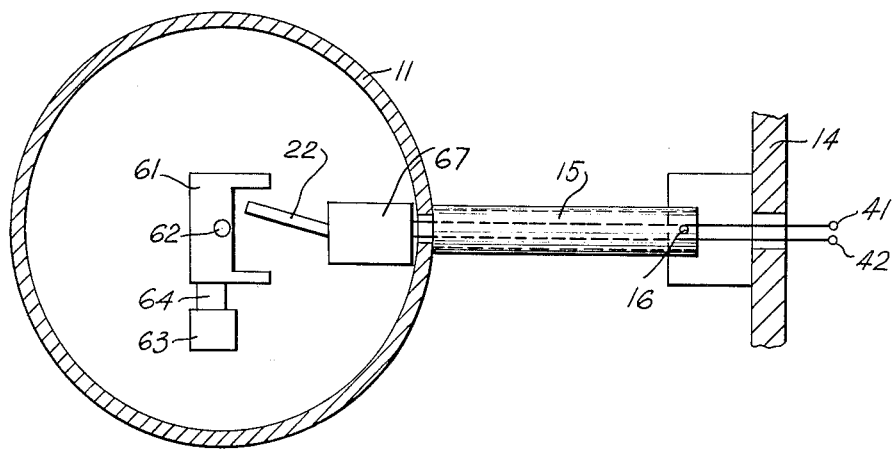
FIG. 6 is a side view, partly in section, of another embodiment of the float and switch portions of the apparatus of the present invention.

FIG. 6 is a side view, partly in section, of another embodiment of the float and switch portions of the apparatus of the present invention. In FIG. 6, the switch actuating unit 61 is pivotally mounted in the float 11 by pivot means 62 and is weighted by a hanging weight 63 which may be affixed in any suitable manner, such as, for example, by attachment to the bottom of said switch actuating unit or attachment to the end of an arm or flexible member, such as, for example, an arm 64, the other end of which is attached to the said switch actuating unit. Thus, the switch actuating unit 61 is maintained, due to its pivotal mounting and weight 63, in a substantially vertical position at any position and inclination of the float 11. The switch actuating unit 61 comprises an upper switch actuating protrusion 65 and a lower switch actuating protrusion 66. The switch unit 67 comprises a fixed circuit contact 21 (shown in FIGS. 2 and 3) and a switch arm 22 pivotally mounted by pivot means 23 (shown in FIGS. 2 and 3) in said switch unit and extending therefrom. The switch unit 67 is carried in the float 11 and the switch actuating protrusions 65 and 66 are spaced from each other and from the switch arm 22 with said switch arm positioned between said protrusions in a manner whereby said switch arm is moved by the said protrusions to operate the switch unit in a manner similar in principle to that described with reference to FIGS. 1 to 4 to control the control circuit.

Thus, when the liquid level is at a preselected height so that the float 11 has a first position and inclination, which position and inclination have been preselected in accordance with the desired maximum level of liquid in the container 13, the switch actuating unit 61 is in substantially vertical position. The inclination of the float 11 is such (FIG. 2) that the lower switch actuating protrusion 66 abuts the switch arm 22 and urges said switch arm about the pivot means 23 to break contact with the fixed contact 21 to open the circuit to de-energize the control means connected in the circuit, as described with reference to FIGS. 2 and 4. When the liquid level is lower than the preselected height so that the float has a second position and inclination, which position and inclination have been preselected in accordance with the desired minimum level of liquid in the container 13, the switch actuated unit 61 is in substantially vertical position. The inclination of the float 11 is such (FIG. 3) that the upper switch actuating protrusion 65 abuts the switch arm 22 and urges said switch arm about the pivot means 23 to contact the fixed contact 21 to close the circuit to energize the control means connected in the circuit, as described with reference to FIGS. 2 and 4.

The float and switch units of the present invention may be utilized to control any desired visual or audio signalling means or any desired control operation; the float and switch units cooperating to function as a switch in the control circuit of the signalling or control means.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. An arrangement comprising a float adapted to float on the liquid in a container; means supporting said float for substantially arcuate movement as said float moves up and down with liquid level changes, through positions which differ with changes in liquid level so that at any one liquid level said float will have a position and inclination different from the position and inclination of the float at any other level, said float having a first position and inclination when the liquid level is at a preselected height and a second position and inclination when the liquid level is lower than said preselected height by a predetermined extent; and switch means pivotally mounted in said float and adapted to be connected in an actuating circuit comprising a circuit contact and a contact component pivotally mounted in said switch means in a manner whereby said contact component is inclined at an angle with reference to said switch means and contacts said contact to close said actuating circuit when said float is in said second position and whereby said contact component is inclined at another angle with reference to said switch means and breaks contact with said contact to open said actuating circuit when said float is in said first position.

2. An arrangement comprising a sealed float adapted to float on the liquid in a container; a support arm pivotally supported at one end on the side wall of the container and supporting said float at the other end thereof so that said float is supported for substantially arcuate movement as said float moves up and down with liquid level changes, through positions which differ with changes in liquid level so that at any one liquid level said float will have a position and inclination different from the position and inclination of the float at any other level, said float having a first position and inclination when the liquid level is at a preselected height and a second position and inclination when the liquid level is lower than said preselected height by a predetermined extent; and switch means pivotally mounted in said float and adapted to be connected in an actuating circuit comprising a circuit contact and a contact component pivotally mounted in said switch means in a manner whereby said contact component is inclined at an angle with reference to said switch means and contacts said contact to close said actuating circuit when said float is in said second position and whereby said contact component is inclined at another angle with reference to said switch means and breaks contact with said contact to open said actuating circuit when said float is in said first position.

3. An arrangement comprising a sealed float adapted to float on the liquid in a container; a support arm pivotally supported at one end on the side wall of the container and supporting said float at the other end thereof so that said float is supported for substantially arcuate movement and so that at different liquid levels said float will have respectively different positions and inclinations, said float having a first position and inclination when the liquid level is at a preselected height and a second position and inclination when the liquid level is lower than said preselected height by a predetermined extent; and a switch unit pivotally mounted in said float and adapted to be connected in an actuating circuit comprising a fixed circuit contact and a switch arm pivotally mounted in said switch unit in a manner whereby said switch arm is inclined at an angle with reference to said switch unit and contacts said fixed contact to close said actuating circuit when said float is in said second position and whereby said switch arm is inclined at another angle with reference to said switch unit and breaks contact with said fixed contact to open said actuating circuit when said float is in said first position.

4. An arrangement comprising a sealed float adapted to float in the liquid in a container; a support arm pivotally supported at one end on the side wall of the container and supporting said float at the other end thereof so that said float is supported for substantially arcuate movement and so that at different liquid levels said float will have respectively different positions and inclinations, said float having a first position and inclination when the liquid level is at a preselected height and a second position and inclination when the liquid level is lower than said preselected height by a predetermined extent; a switch unit pivotally mounted in said float and weighted to maintain said switch unit in substantially vertical position at any position and inclination of said float, said switch unit being adapted to be connected in an actuating circuit and comprising a fixed circuit contact and a switch arm pivotally mounted in said switch unit; and a pair of switch actuating means carried by said float and spaced from each other and from said switch arm in a manner whereby said switch arm is inclined at an angle with reference to said switch unit and is urged by said switch actuating means to contact said fixed contact to close said actuating circuit when said float is in said second position and inclination and whereby said switch arm is inclined at another angle with reference to said switch unit and is urged by said switch actuating means out of contact with said fixed contact to open said actuating circuit when said float is in said first position and inclination.

5. An arrangement comprising a sealed float adapted to float on the liquid in a container; a support arm pivotally supported at one end on the side wall of the container and supporting said float at the other end thereof so that said float is supported for substantially arcuate movement and so that at different liquid levels said float will have respectively different positions and inclinations, said float having a first position and inclination when the liquid level is at a preselected height and a second position and inclination when the liquid level is lower than said preselected height by a predetermined extent; a switch unit pivotally mounted in said float and weighted to maintain said switch unit in substantially vertical position at any position and inclination of said float, said switch unit being adapted to be connected in an actuating circuit and comprising a fixed circuit contact and a switch arm pivotally mounted in said switch unit and extending therefrom; and a pair of switch actuating protrusions carried in said float spaced from each other and from said switch arms in a manner whereby said switch arm abuts one of said switch actuating protrusions and is urged thereby to contact said fixed contact to close said actuating circuit when said float is in said second position and inclination, and whereby said switch arm abuts the other of said switch actuating protrusions and is urged thereby to break contact with said fixed contact to open said actuating circuit when said float is in said first position and inclination.

6. An arrangement comprising a sealed float adapted to float on the liquid in a container; a support arm pivotally supported at one end on the side wall of the container and supporting said float at the other end thereof so that said float is supported for substantially arcuate movement and so that at different liquid levels said float will have respectively different positions and inclinations, said float having a first position and inclination when the liquid level is at a preselected height and a second position and inclination when the liquid level is lower than said preselected height by a predetermined extent; a switch unit carried in said float, said switch unit being adapted to be connected in an actuating circuit and comprising a fixed circuit contact and a switch arm pivotally mounted in said switch unit and extending therefrom; and a switch actuating unit pivotally mounted in said float and weighted to maintain said switch actuating unit in substantially vertical position at any position and inclination of said float, said switch actuating unit having a pair of switch actuating protrusions spaced from each other and from said switch arm in a manner whereby said switch arm abuts one of said switch actuating protrusions and is urged thereby to contact said fixed contact to close said actuating circuit when said float is in said second position and inclination and whereby said switch arm abuts the other of said switch actuating protrusions and is urged thereby to break contact with said fixed contact to open said actuating circuit when said float is in said first position and inclination.

References Cited in the file of this patent

UNITED STATES PATENTS

| | | |
|---|---|---|
| 1,875,510 | Shivers | Sept. 6, 1932 |
| 2,413,138 | Geinberg | Dec. 24, 1946 |
| 2,580,759 | Gille | Jan. 1, 1952 |